United States Patent
Zilberman et al.

(10) Patent No.: US 9,211,689 B2
(45) Date of Patent: Dec. 15, 2015

(54) COMPOSITE MATERIAL STRUCTURES WITH INTEGRAL COMPOSITE FITTINGS AND METHODS OF MANUFACTURE

(71) Applicant: ELBIT SYSTEMS-CYCLONE LTD., Carmiel (IL)

(72) Inventors: Lior Zilberman, Haifa (IL); Oran Katzuni, Carmiel (IL); Leve Cohen, Acre (IL)

(73) Assignee: Elbit Systems—Cyclone, Ltd., Carmiel (IL)

( * ) Notice: Subject to any disclaimer, the term of this patent is extended or adjusted under 35 U.S.C. 154(b) by 0 days.

(21) Appl. No.: 13/760,872

(22) Filed: Feb. 6, 2013

(65) Prior Publication Data
US 2014/0154458 A1    Jun. 5, 2014

(30) Foreign Application Priority Data
Dec. 4, 2012 (IL) .......................................... 223443

(51) Int. Cl.
*B32B 3/06* (2006.01)
*B29C 70/68* (2006.01)
(Continued)

(52) U.S. Cl.
CPC .................. *B32B 3/06* (2013.01); *B29C 70/682* (2013.01); *B29C 70/86* (2013.01); *B29C 70/48* (2013.01); *B29L 2031/3076* (2013.01); *Y10T 428/24008* (2015.01)

(58) Field of Classification Search
CPC .... B29C 33/301; B29C 70/48; B29C 70/543; B29C 70/545; B29C 2031/3076; B64C 1/1407; B64C 1/143; B64C 1/1461; B64C 1/26

USPC ............ 428/188, 99; 244/129.5–131; 29/428; 156/243; 249/64; 416/223 R, 230
See application file for complete search history.

(56) References Cited

U.S. PATENT DOCUMENTS

| | | |
|---|---|---|
| 5,224,670 A | 7/1993 | Padden |
| 6,234,423 B1 | 5/2001 | Hirahara et al. |

(Continued)

FOREIGN PATENT DOCUMENTS

| | | |
|---|---|---|
| EP | 1957360 | 8/2008 |
| WO | 2007-062641 | 12/2006 |

OTHER PUBLICATIONS

International Search Report Dated May 16, 2007 for PCT/DE2006/002138; 6 Pages.

(Continued)

*Primary Examiner* — Maria Veronica Ewald
*Assistant Examiner* — Brian Handville
(74) *Attorney, Agent, or Firm* — Vedder Price P.C.

(57) ABSTRACT

Composite material structures prepared from at least one reinforcement material and at least one matrix material are disclosed. The invention provides a simple solution for combining two or more components made of a composite material into a monolithic "fastener free" structure of a composite material having a smooth contour. The composite material structure includes a main frame with at least one load bearing beam having at least one beam surface. To this beam surface at least one composite material fitting is integrally attached. The main frame and the composite material fitting are conjoined by at least one matrix material. In addition, the disclosed technique provides for methods of production of a composite material structure with fittings made of a composite material.

17 Claims, 11 Drawing Sheets

(51) Int. Cl.
   *B29C 70/86*   (2006.01)
   *B29L 31/30*   (2006.01)
   *B29C 70/48*   (2006.01)

(56) References Cited

U.S. PATENT DOCUMENTS

| | | |
|---|---|---|
| 6,431,837 B1 | 8/2002 | Velicki |
| 7,226,272 B2 | 6/2007 | Becker |
| 7,270,516 B2 | 9/2007 | Becker |
| 7,452,156 B2 | 11/2008 | Kennedy |
| 7,578,476 B2 | 8/2009 | Wiers |
| 7,972,114 B2 | 7/2011 | Gupta |
| 2002/0100840 A1 | 8/2002 | Billinger et al. |
| 2002/0195524 A1 | 12/2002 | Amaoka |
| 2007/0154680 A1* | 7/2007 | Escobar Benavides et al. ............... 428/99 |
| 2007/0161483 A1 | 7/2007 | Raf |
| 2007/0175573 A1 | 8/2007 | Fox |
| 2008/0168619 A1 | 7/2008 | Gonzalez et al. |
| 2009/0078826 A1 | 3/2009 | Haensch |
| 2009/0200425 A1* | 8/2009 | Kallinen et al. ............... 244/131 |
| 2010/0136293 A1 | 6/2010 | Kubryk |
| 2010/0294888 A1 | 11/2010 | Texcier et al. |
| 2011/0059290 A1* | 3/2011 | Gage et al. ............... 428/99 |
| 2011/0111172 A1 | 5/2011 | Gideon |
| 2011/0168324 A1 | 7/2011 | Ender |
| 2012/0025022 A1 | 2/2012 | Buchs |
| 2012/0091275 A1 | 4/2012 | Villares |

OTHER PUBLICATIONS

Ichard, Jean-Christophe and Pelletret, Patrick, "Design, Substantiation and Manufacturing of an Innovative Aircraft Passenger Door Structure", SAMPE SEICO 11 Paris-32nd International Conference; 135 Rue de Periole, 31079 Toulouse, France; 10 Pages.

* cited by examiner

COMPOSITE MATERIAL STRUCTURES WITH INTEGRAL COMPOSITE FITTINGS AND METHODS OF MANUFACTURE

RELATED APPLICATION DATA

This application claims the benefit of Israeli Patent Application No. 223443 filed Dec. 4, 2012, which application is hereby incorporated by reference in its entirety.

FIELD OF THE DISCLOSED TECHNIQUE

The disclosed technique relates to composite material structures and to methods of their manufacture. In particular, the present invention relates to composite material structures that include fittings also made of a composite material and to methods of manufacturing composite material structures and fittings.

BACKGROUND OF THE DISCLOSED TECHNIQUE

Composite materials are used for preparing structural components of airplanes, helicopters, other aircraft and vehicles. A composite material is made from two or more constituent materials: a matrix material and a reinforcement material. The matrix material (also referred to herein as simply the matrix) and reinforcement material (also referred to herein as reinforcements) have significantly different physical properties, chemical properties or both. The reinforcement material imparts its mechanical and physical properties to enhance the matrix material properties resulting in the composite material exhibiting enhanced synergistic properties.

Commonly used reinforcements are glass, carbon, silicon carbide, aramid and a high strength polyethylene fiber (such as Spectra®). The reinforcements may include a variety of fiber types in various forms such as continuous fibers, mat or woven type construction as well as a hybrid of more than one fiber type. Regarding the matrix, there are three main groups of matrices, namely, polymers (also known as plastics or resins), metals (and their alloys) and ceramics. Both thermoplastic and thermoset polymers are employed in making composite materials. Polyethylene, polystyrene, polyamides, nylon, polycarbonates, polysulfaones, and the like are common thermoplastics whereas common thermosets include epoxy, phenolic, polyester, silicone, bismaleimide, polyimide, polybenzimidazole, and the like. The method of production may be selected from RTM (an abbreviation of Resin Transfer Molding) in a closed-mold, compression molding, autoclave processing (open and closed mold), open mold resin infusion (herein abbreviated RI), vacuum bag molding and filament winding of tows or tapes and the like.

Composite materials are used in the preparation of various components for aircrafts due to the considerable reduction in weight achieved in the finished aircraft. Usually each of the various components is manufactured separately and coupled to the structure in a separate procedure until the final structure is obtained. These components are often assembled together by fittings. Coupling of components can be made by welding (for metal parts), by mechanical fastening using rivets or screws (for metals and/or composite parts) or by a combination of adhering and fastening (for metals and/or composite parts). Fittings are usually produced from metal, specifically aluminum or titanium alloys. The fittings are riveted and/or adhered to the composite structure. However, this mode of production results in a higher product price due to the number of steps in the production process. This mode of production is also prone to imprecisions in the final product and mechanical weakening of the assembly. For example, US Patent Application Publication No. 2008/0168619 to Gonzalez et al., entitled "Process for production of aircraft stops, and aircraft door stops made of carbon composite material" describes a process for the production of an aircraft stop that includes a metal insert. The preparation process includes multiple steps. In one step, the metal insert is covered by draping pre-impregnated carbon fiber layers which are eventually folded down on one another and are oriented so as to ensure maximum cohesion of the layers around the metal insert. The metal insert is designed to accommodate a stop screw by which it is secured to the door.

An additional example is shown in US Patent Application Publication No. 2010/0294888 to Texcier et al., entitled "Aircraft opening panel especially an air plane cabin door" which describes a panel made of composite material which comprises a retainer made of titanium. This retainer consists of a retaining part and a mounting part wherein the mounting part is fastened to a beam of the door by means of fasteners, particularly nuts and bolts. In this design the metal fittings and the composite material have different coefficients of thermal expansion (herein abbreviated CTE or CTEs) which yield immense shearing forces that act between the two elements. In order to overcome deterioration of the structure and corrosion in the contact surface between the metal and the composite material, additional procedures of releasing stresses caused by thermal expansion must be added to the production process. Furthermore, modifications introduced in the structure contour impair the aerodynamic shape of the final structure. These are major drawbacks of structures made of a composite material and metal fittings.

Composite structures with fittings made from composite materials exist. In such composites structures, each of the components of the main structure is manufactured individually and then all the components are secured to each other by metal screws and the like. For example, US Patent Application Publication No. 2002/0100840 to Billinger et al., entitled "Device for connecting movable parts with structural elements of airplanes or the like" discloses a connecting device which comprises at least one fitting made of a composite material and designed with an aperture configured to receive at least one bearing. In this publication the attachment between a spoiler (a movable part) and a composite material fitting is effected by gluing the composite material fitting on an indentation formed in an external wall of the spoiler. This particular attachment requires additional connecting elements like screws or rivets.

An additional publication is U.S. Pat. No. 6,234,423 to Hirahara et al., entitled "Composite airfoil structures and their forming methods." The patent is directed to a box-structure constructed of a composite material upper skin, a composite material lower skin and a spar which is also made of a composite material. Hirahara et al. use laminates of prepreg material for the skins. The spar is made up of flanges which are bonded to the individual skins by an adhesive.

A limitation of the above structure is the manufacturing process which results in a higher product price due to the number of steps in the process and the use of autoclave technology. This mode of production is also prone to imprecisions in the final product since the composite parts are adhered to each other after the curing of each composite component. The glue used for coupling the parts together can modify the dimensions of the product when used in excess and can add extra weight to the final product.

SUMMARY OF THE PRESENT DISCLOSED TECHNIQUE

The prior art does not provide a simple solution for combining two or more components made of a composite material into a monolithic "fastener free" structure of a composite material having a smooth contour. The prior art discloses composite material structures that require rivets and screws for securing one component to another. The prior art also does not provide a simple low-cost method of manufacture of a composite material structure with embedded fittings that can be produced in a one-step procedure.

The disclosed technique provides a composite material structure such as a wing, a control surface, a flap, an aileron, a spoiler, a rudder, a stabilizer, an airplane cabin door, an airplane barrel section, a nacelle section, a body or chassis section and a fairing or a cover, an external fuel tank sections or a complete external fuel tank, and the like. The disclosed composite material structure of the disclosed technique overcomes the disadvantages of the prior art. The composite material structure is prepared from at least one reinforcement material and at least one matrix material. The composite material structure includes a main frame with at least one load bearing beam having at least one beam surface. To this beam surface at least one composite material fitting is integrally attached. The composite material fitting includes at least one mount portion having a bore for receiving a tubular bushing and an anchoring structure extending from or coupled with the mount portion. The anchoring structure includes at least one anchoring surface. At least one of the anchoring surfaces is locally aligned with a beam surface. Each of the main frame and the composite material fitting is prepared from at least one reinforcement material and at least one matrix material. Additionally, the main frame and the composite material fitting are conjoined by at least one matrix material. In addition, the disclosed technique provides for a method of production of a composite material structure with fittings made of a composite material wherein the fittings are reinforced with metal plates in order to reduce local stresses that develop in the fitting as a result of an interface with an external body.

The disclosed technique further provides a composite material structure prepared from at least one reinforcement material and at least one matrix material. The composite material structure includes a main frame constructed from layers of reinforcement material. The main frame includes at least one load bearing beam having at least one beam surface to which at least one composite material fitting is integrally attached. The composite material fitting includes at least one mount portion comprising a bore for receiving a tubular bushing and an anchoring structure extending from or coupled with mount portion. The anchoring structure consists of at least one anchoring surface. At least one of the at least one anchoring surfaces is locally aligned with a beam surface. Each of the main frame and the composite material fitting are prepared from at least one reinforcement material and at least one matrix material. The main frame and the composite material fitting are conjoined by the matrix material.

The disclosed technique further aims at providing a novel method for manufacturing a composite material structure. The composite material structure is prepared from at least one reinforcement material and at least one matrix material. The composite structure includes at least one integral composite material fitting that is mechanically locked between layers of the composite material structure and adhered thereto. The method comprises the following procedures: layering in a mold a reinforcement material for a main frame of a composite material structure. Thereafter, at least one fitting is positioned adjacent to a load bearing beam of the main frame. Then, the reinforcement material of the main frame is draped around a portion of the fitting. A mount portion of the fitting is masked. The mold is then closed. A matrix is injected into the closed mold and then the composite structure is cured. Subsequently, the composite structure is de-molded (removed from the mold) and the mask is removed from the fitting as well. The final procedure comprises trimming the composite structure contour and fitting mount portion.

According to a further aspect of the disclosed technique there is thus provided a method for manufacturing a composite material structure which includes at least one reinforcement material and at least one matrix material. The composite material structure also includes at least one integral composite material fitting that is mechanically locked between the layers of the composite material structure and adhered thereto. The method comprises the following procedures: layering a prepreg material in a mold for a main frame structure of a composite material. Then, at least one fitting is positioned adjacent to the main frame structure of the composite material. The prepreg material is draped around the fitting. Thereafter, a mount portion of the fitting is masked. The mold is then closed. The composite structure is cured. Subsequent to curing the structure is demolded and the mask is removed from the fitting. Trimming the composite structure contour and fitting mount portion is carried out after removal of the composite structure from the mold.

In another aspect of the disclosed technique there is thus provided a method for preparation of a continuous panel with a plurality of fittings made of a composite material, the method comprising the procedures of: layering a reinforcement material for a continuous panel including a plurality of fittings in a mold; draping the reinforcement material according to the contour of the mold; closing the mold; injecting a matrix into the closed mold; curing the composite structure; demolding the structure; trimming the panel into a plurality of fittings; and finishing the contour of each fitting.

BRIEF DESCRIPTION OF THE DRAWINGS

The disclosed technique will be understood and appreciated more fully from the following detailed description taken in conjunction with the drawings in which.

DETAILED DESCRIPTION OF THE EMBODIMENTS

The terms "matrix", "resin" and "epoxy" herein refer to a main component of a composite material, which is a binding substance surrounding a reinforcement material or materials such as the plastic in a fiber-reinforced plastic. The terms are used interchangeably throughout the description. The terms "reinforcement material", "reinforcements", "carbon fabric" and "dry reinforcement material" herein refer to a main component of a composite material that is used to stiffen a composite structure. The terms are used interchangeably throughout the description. The term "main frame" as used herein refers to a body of a unit which is assembled from various components such as beams, ribs, spars, and the like.

The term "locally aligned" herein refers to a position wherein a first surface (or layer) having a particular curvature is arranged in near proximity to a second surface having a particular curvature such that at any point their curvatures match. In locally aligned surfaces, the two surfaces are adjacent wherein each point on the first surface is aligned with a point on the second surface. However, in locally aligned surfaces, both surfaces are not necessarily parallel or strictly aligned.

The term "closed structure" refers to a structure in which the layers of the outer surface completely surround the structure, the inner components (such as beams, spars, fittings and the like) or both. The wrapping of the outer layers is formed such that each upper layer covers at least a part of a lower layer positioned underneath. In other words, each upper layer overlaps at least a part of the lower layer. In a closed structure, an upper layer may end substantially in the middle part of the structure and not at the edges of the structure.

The composite material structure disclosed herein can be manufactured for use in an aircraft as part of its structure, such as a wing, a control surface (as a flap, an aileron, a spoiler, a rudder, a stabilizer and the like), an airplane cabin door, an airplane barrel section, a nacelle section, a body or chassis section and a fairing or a cover, an external fuel tank sections or a complete external fuel tank, and the like. In addition, the composite material structure of the disclosed technique can also be used for manufacturing other types of products such as structural and/or armored components for civil and military applications. The description herein of the disclosed technique as it relates to manufactured parts for aircraft should be viewed as merely an example of the uses of the disclosed technique.

Figure 1:
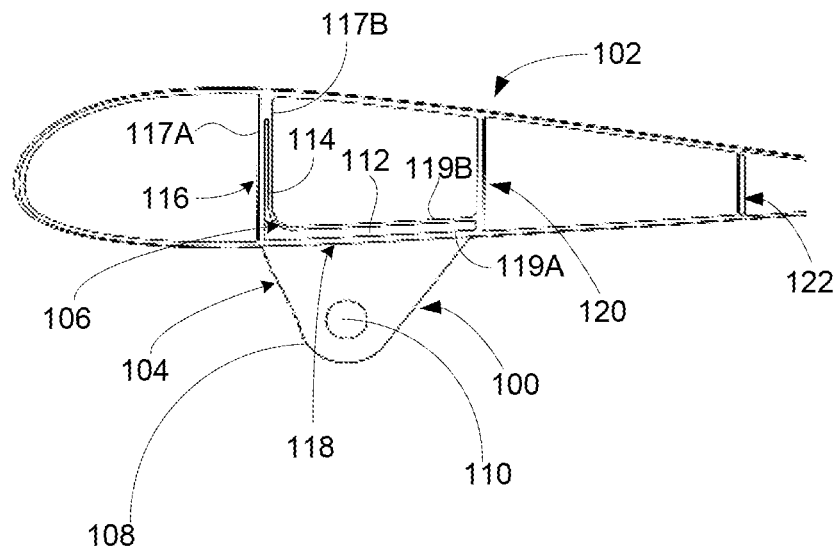
FIG. 1 is a cross-sectional side view of a fitting positioned within a main frame of a composite material structure, constructed and operative in accordance with an embodiment of the disclosed technique.

FIG. 1 is a cross-sectional side view of a fitting, generally referenced 100, positioned within a main frame of a composite material structure, generally referenced 102, constructed and operative in accordance with an embodiment of the disclosed technique. Fitting 100 includes a mount portion 104 and an anchoring structure 106. Mount portion 104 includes a plurality of bearings 108 with respective bores 110 for receiving a tubular bushing (not shown). As can be seen, bearings 108 project outward from anchoring structure 106. Anchoring structure 106 extends from mount portion 104 and includes anchoring surfaces 112 and 114 which are structural elements that together enable the mechanical fastening of fitting 100 to main frame 102. Main frame 102 is the structure to which the fitting is intended to be attached with. Main frame 102 includes at least one load bearing beam. As shown in FIG. 1, main frame 102 includes a load bearing beam 116 that is separated (i.e., not necessarily divided) into a first beam surface 117A and a second beam surface 117B. Additional load bearing beams are numbered as 120 and 122. Fitting 100 is positioned within main frame 102 between load bearing beams 116 and 120. Anchoring surface 114 is locally aligned with first beam surface 117A and second beam surface 117B. In particular, reinforcement layers (not shown) that form load bearing beam 116 are separated or divided such that in between them anchoring surface 114 is inserted. For the purposes of simplifying FIG. 1, main frame 102 includes a main frame surface 118 located between load bearing beam 116 and load bearing beam 120. Anchoring surface 112 is positioned between a first main frame surface 119A and a second main frame surface 119B. Anchoring surface 112 is locally aligned with main frame surfaces 119A and 119B. As a result, fitting 100 is embedded in main frame 102 such that the end product is a monolithic "fastener free" structure of a composite material having a smooth contour.

Figure 2:
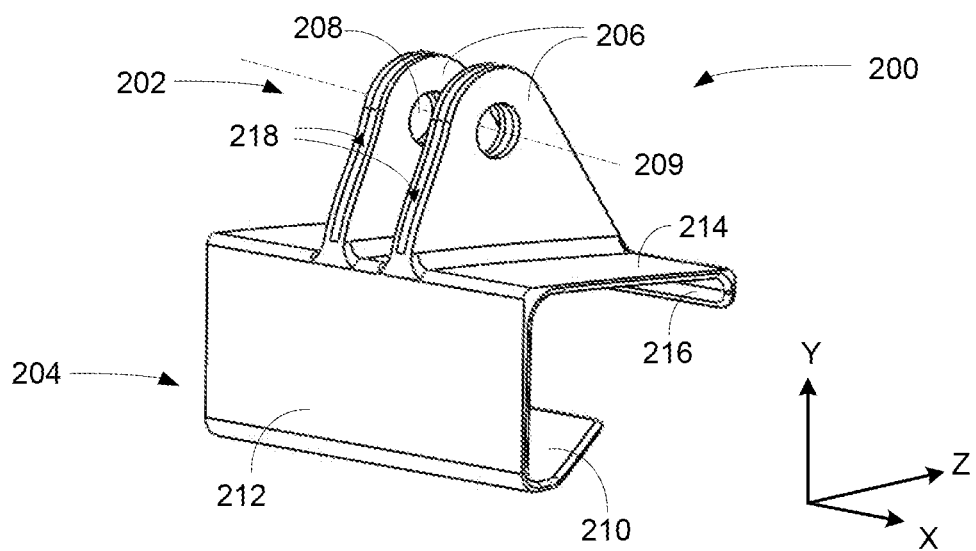
FIG. 2 is a top perspective view of a fitting, constructed and operative in accordance with an alternative embodiment of the disclosed technique.

FIG. 2 is a top perspective view of a fitting, generally referenced 200, constructed and operative in accordance with an alternative embodiment of the disclosed technique. Fitting 200 includes a mount portion 202 and an anchoring structure 204. Mount portion 202 includes a plurality of bearings 206 with respective bores 208 for receiving a tubular bushing (not shown). The tubular bushing can be made of metal and is required during the operation lifetime of fitting 200 in order to eliminate deformation of the bores. In an alternative embodiment the tubular bushing can be made from one of the following materials: ceramics, polymers, Teflon and the like. As can be seen, bearings 206 project outwards from anchoring structure 204. For the purposes of illustration only, a horizontal X axis and a vertical Y axis which is perpendicular to the X axis, together define an X-Y plane which is substantially perpendicular to the center axis of bores 208. The center axis of bores 208 is illustrated in a dotted line and referenced as 209 in FIG. 2. FIG. 2 also designates a Z axis, as shown. Anchoring structure 204 includes anchoring surfaces 210, 212, 214 and 216 extending from or coupled with mount portion 202. In particular, a first anchoring surface 210 is slightly slanted with respect to plane X-Z (the angle depends on the specific contour of the main frame). A second anchoring surface 212 is substantially parallel to the X-Y plane and substantially perpendicular to the center axis of bores 208. Specifically, anchoring surface 212 can be in an angle in a range of between 70 to 110 degrees with respect to the center axis of bores 208. A third anchoring surface 214 extends from anchoring surface 212 and is substantially parallel to the X-Z plane. The fourth anchoring surface 216 extends from anchoring surface 214 and is substantially parallel to anchoring surface 212. At least one of the anchoring surfaces is substantially perpendicular to the center axis of bores 208 which is substantially perpendicular to the plane defined by the axes of mount portion 202 (i.e., the Y-Z plane). Anchoring surfaces 210, 212, 214 and 216 are structural elements that together enable the mechanical fastening of fitting 200 to a main frame, which is the structure to which the fitting is intended to be attached with. Positioning the anchoring structure within the main frame and wetting both composite material fitting and main frame together with the injected resin results in co-bonding or co-curing of the fitting with the main frame and as a result after curing they are fused to one another.

As can be further seen, bearings 206 are reinforced with metal plates 218. Composite materials are sensitive to local compression which can result in permanent deformation, local crushes and gradual wearing of the composite material. By adding metal plates 218 to bearings 206, additional structural resistance is provided to the bearings. Metal plates 218 can be produced from metals such as aluminum, magnesium, titanium, steel and their alloys. In a preferable embodiment of the disclosed technique titanium plates are used due to the low coefficient of linear thermal expansion (CTE) of titanium. The CTE of titanium is relatively close to the CTE of carbon and therefore a composite material comprising both is less prone to thermal stresses.

According to a further embodiment of the disclosed technique metal plates 218 are thin titanium plates inserted in head portion 202 during the manufacturing of the fitting. According to another embodiment of the disclosed technique, metal plates 218 are attached to the composite material fitting after curing yet before the stage of positioning the fitting on the main frame of the composite material (as per procedure 902 below in FIG. 11). Nevertheless, bearings 206 can be further reinforced with plates of another material that has improved friction-resistance or compression-resistance as compared to the composite material, such as aluminum.

Figure 3:
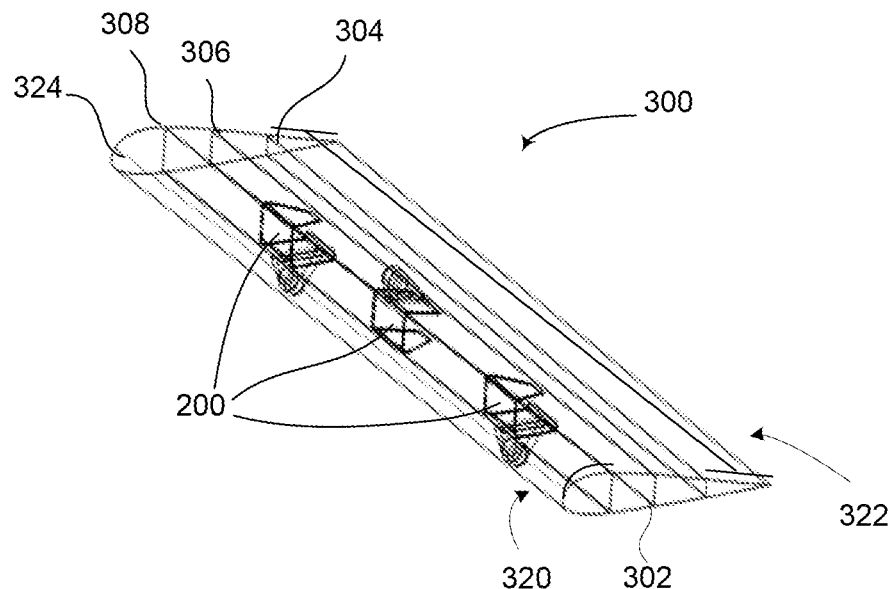
FIG. 3 is a side perspective view of a flap which includes fittings, constructed and operative in accordance with another embodiment of the disclosed technique.
Figure 4:
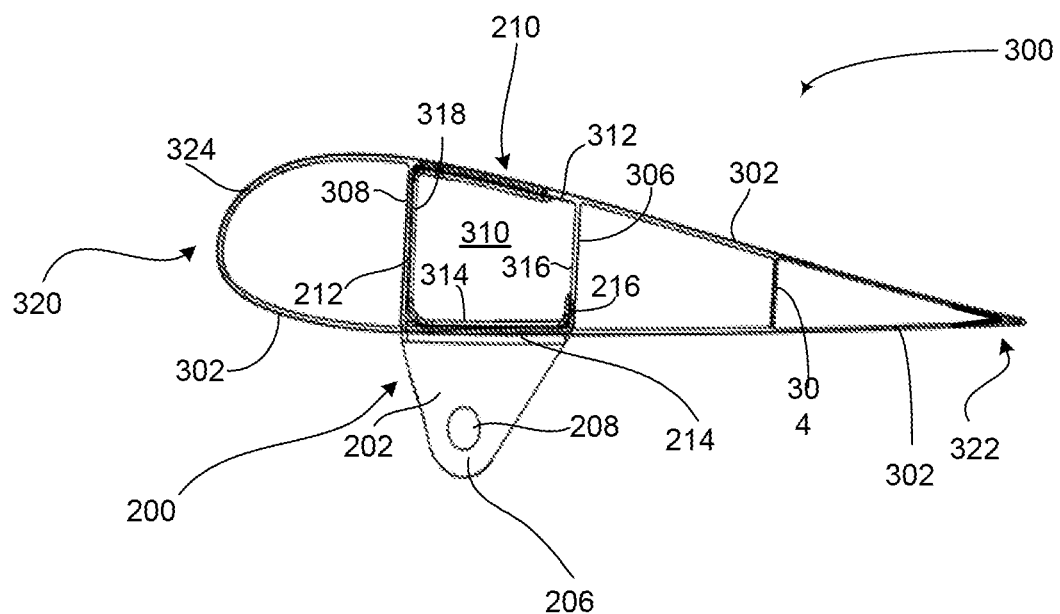
FIG. 4 is a cross-sectional side view of the flap shown in FIG. 3, constructed and operative in accordance with a further embodiment of the disclosed technique.

Reference is now made to FIGS. 3 and 4. FIG. 3 is a side perspective view of a flap 300 which includes a plurality of fittings 200, constructed and operative in accordance with an embodiment of the disclosed technique. FIG. 4 is a cross-sectional side view of flap 300 shown in FIG. 3. In general, flap 300 is a composite material structure which includes a main frame 302 and at least one composite material fitting 200. Reference numbers to elements of composite material fitting 200 are substantially similar to the reference numbers used in FIG. 2. In FIG. 3 it can be seen that flap 300 includes three composite material fittings 200. The main frame of the composite material structure 302 is assembled from at least one load bearing beam (304, 306 and 308) having at least one beam surface (shown in FIG. 4) to which at least one composite material fitting is integrally attached.

Reference is now made to FIG. 4. In FIG. 4 it is shown that flap 300 is composed from a main frame 302 that includes three load bearing beams 304, 306 and 308. Load bearing beams 306 and 308 and main frame 302 define compartment 310 which is substantially rectangular or trapezoidal in its cross-sectional shape. Compartment 310 is formed of four inner surfaces: 312, 314, 316 and 318 which all face the interior of compartment 310. Frame surfaces 312 and 314 are part of main frame 302. Beam surface 316 is a part of beam 306. Beam surface 318 is a part of beam 308. All four inner surfaces are actually part of main frame 302. As can be seen, anchoring surface 210 is locally aligned with frame surface 312. Inner surface 318 is locally aligned with anchoring surface 212 while frame surface 314 is locally aligned with anchoring surface 214. In addition, anchoring surface 216 is locally aligned with a part of beam surface 316.

As will be explained in detail below, during the manufacturing of the composite material structure at least one fitting is positioned in the main frame adjacent to beams 306 and 308 such that each fitting interlocks with at least one of the adjacent beam surfaces which are a part of main frame 302. As soon as all fittings are positioned, a reinforcement material is draped (in layers) around the fittings such that the main frame and fittings are wrapped with the reinforcement material preferably to provide a closed structure which improves the attachment of all structural components. The term "closed structure" means a structure in which the layers of the outer surface completely surround the structure, the inner components such as beams, spars, fittings and the like, or both. The wrapping of the external layers is formed such that each upper layer covers at least a part of a lower layer positioned underneath. In other words, each upper layer substantially overlaps at least a part of the lower layer such that a layer preferably ends in the middle part of the structure and not at the edges of the structure. Such a wrapping diminishes the formation of cracks, de-bonds and delamination between the exterior portions of the composite structure which are less prone to local stresses. In one embodiment of the disclosed technique, the main structure is cured at the same time ("co-cured") with the fitting. The required main structure is formed from dry reinforcement material as well as the shape of the required fitting. Thereafter the dry preform of the fitting is positioned into the main frame and a matrix is injected into the complete structure. As the matrix wets the dry fabric and the composite structure (main frame and fittings) is cured, surfaces 210, 312 and 302, surfaces 212, 318 and 308, surfaces 214, 314 and 302, and surfaces 216, 316 and 306 are conjoined by the matrix into a monolithic structure. This mechanical fastening further eliminates or reduces the use of rivets and screws by providing a simple low-cost method of manufacture in order to get an integral composite structure that is more weight efficient, cost effective and is mechanically better as compared to other composite structures that are assembled with composite fittings, as detailed above.

Main frame 302 has a leading edge 320 and a trailing edge 322 both preferably are part of the outer skin (of main frame 302) to create a closed structure. Flap 300 may include a protection element 324 such as an elastomeric layer. Protection element 324 covers a substantive portion of leading edge 320. The protection element is coupled to the reinforcement material or is interlaced in the main frame contour of the flap during the preparation of the composite structure. Specifically, the protection element is coupled to the main frame before the procedure of curing. Preferably, the protection element co-bonds to the main frame with the resin used for impregnating the main frame and in the same injection process. Thus after curing, the protection element becomes an integral part of the composite material structure. Protection element 324 can be a rubber layer, elastomeric layer, polyurethane protective strip or bulk or any other material having appropriate properties for protecting the leading and/or trailing edge of the flap from erosion or wear. In an additional embodiment of the disclosed technique, the protection element can be an elastomeric paste that is brushed or sprayed over the main frame during the production process or after curing of the composite material. In a further embodiment of the disclosed technique, protection element 324 is embedded between the layers of the main frame of the composite structure.

In a further embodiment of the disclosed technique, flap 300 includes a detachable fuel compartment made of a composite material (not shown) which is accommodated in the compartments formed in the main frame of the flap between the load bearing beams. During the preparation of the main frame of the flap, mandrels (which are parts of the mold used for preparing the composite structure) are covered with sealing material such as dichromate cured polysulfide compound, on which layers of reinforcement material are wrapped. Thereafter, the process of preparation is similar to procedures 900 to 916, described in FIG. 11 below. Alternatively, the sealing material is adhered to the internal layers of the main frame before layering the remaining reinforcement material and then the mold is closed. The obtained structure, after curing and de-molding can be used as a fuel compartment. Additional disclosure as to the method of preparation of the main frame will be detailed herein below.

In a further embodiment of the disclosed technique, an external fuel tank that consists of a composite compartment is connected to a bottom portion of a wing of an airplane via composite fittings that are embedded in the main frame of the composite compartment of the fuel tank.

Figure 5:
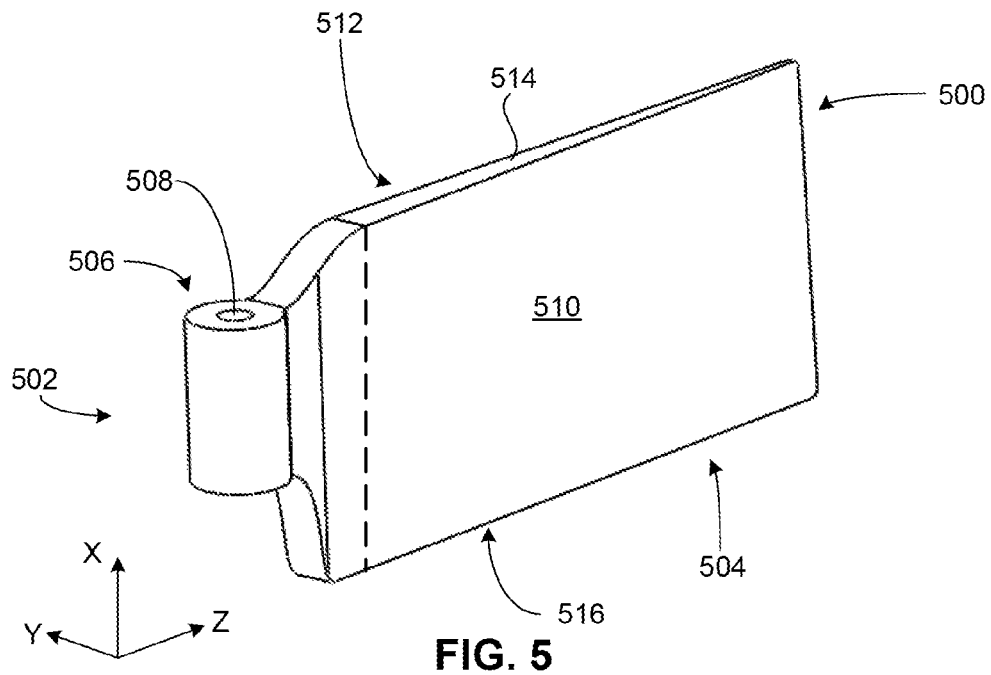
FIG. 5 is a perspective view of a fitting for an airplane cabin door structure illustrated in FIGS. 6A-6B, constructed and operative in accordance with another embodiment of the disclosed technique.
Figure 6A:
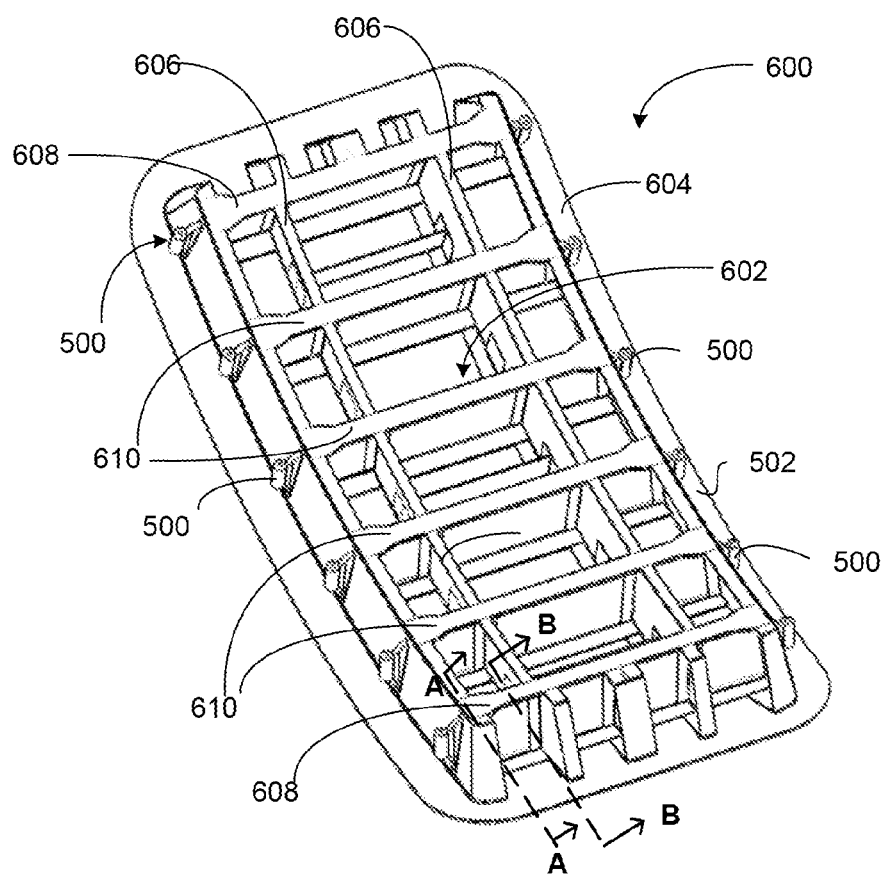
FIG. 6A is a top perspective view of an airplane cabin door structure with the fitting depicted in FIG. 5, constructed and operative in accordance with a further embodiment of the disclosed technique. Cross-sectional views of the load bearing beam along line A-A and line B-B are shown in FIGS. 9A and 9B, respectively.
Figure 6B:
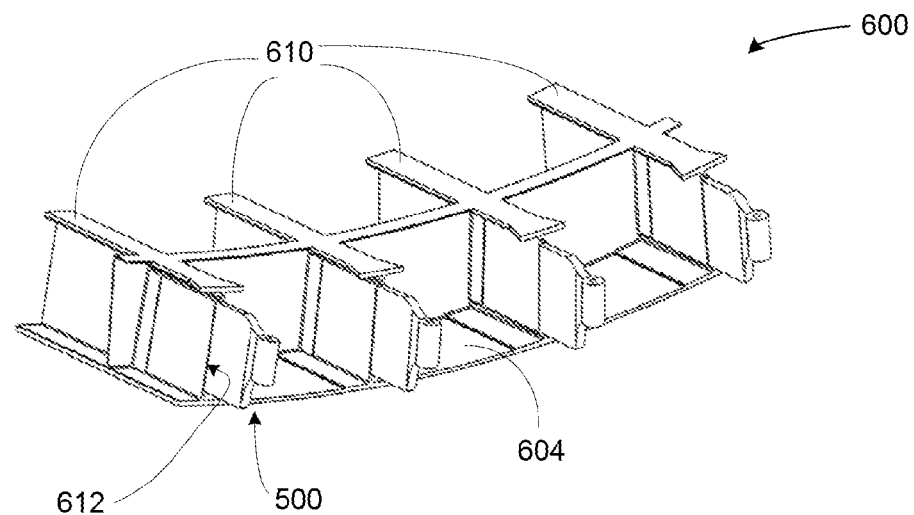
FIG. 6B is an exploded side perspective view of a center portion of the airplane cabin door structure illustrated in FIG. 6A, constructed and operative in accordance with an alternative embodiment of the disclosed technique.

According to another embodiment of the disclosed technique, the composite material structure is an aircraft opening panel structure, for example an airplane cabin door structure. The door structure can be manufactured from a composite material in one production step. Such a door costs and weighs substantially less than a standard metal door or a "black aluminum" door used in aircrafts. FIG. 5 depicts a perspective view of a fitting (or a retainer or a "stop") for an airplane cabin door structure as illustrated in FIGS. 6A-6B, constructed and operative in accordance with a further embodiment of the disclosed technique. As illustrated, fitting 500 includes a mount portion 502 and an anchoring structure 504. Mount portion 502 also includes bearing 506 with longitudinal bore 508 designed for receiving a tubular bushing (shown in FIGS. 7B and 8). Anchoring structure 504 includes anchoring surfaces 510, 512, 514 and 516 extending from mount portion 502. The dashed line in FIG. 5 indicates an imaginary boundary line separating between mount portion 502 and anchoring structure 504. After assembly, mount portion 502 projects outwards from the end section of slot 612 (FIG. 6A). Additional details regarding the manufacture of fitting 500 are disclosed herein below with respect of FIGS. 13-15B.

Reference is now made to FIGS. 6A and 6B. FIG. 6A is a top perspective view of an aircraft opening panel structure, for example an airplane cabin door structure, generally referenced 600, and FIG. 6B is an exploded side perspective view of a center portion of the door structure illustrated in FIG. 6A. Both figures represent an embodiment constructed and operative in accordance with the disclosed technique. An airplane cabin door structure 600 as illustrated in FIGS. 6A and 6B is composed of a main frame 602 and a plurality of fittings 500. As stated above, the term "main frame" as used herein refers to a body of a unit which is assembled from various components such as beams, ribs, spars and the like. For the purposes of the present application, the main frame of an aircraft opening panel such as an airplane cabin door, as illustrated below in FIG. 6A, is divided into a "main frame" and an "outer skin." It is noted however that such terminology is only used for facilitating the explanation of the invention and by no means limits the scope of the invention. The main frame is not necessarily an integral structure as it can consist of parts that are detachable from the structure.

For the purposes of illustration, main frame 602 includes a panel forming an outer skin 604, and a plurality of load bearing beams 606, 608 and 610. Plurality of load bearing beams 606, 608 and 610 and fittings 500 are fitted to each other thus forming the door structure. While the door illustrated in FIG. 6A includes a total of eight load bearing beams, namely two longitudinal load bearing beams 606, four middle horizontal load bearing beams 610 and two end horizontal load bearing beams 608, the number of load bearing beams included in the main frame can of course vary depending on the size of the door and its components, load levels and its distribution, and on its intended use. Optionally, door structure 600 can include different structural designs for each load bearing beam, the difference being, for example, in the dimensions of slot 612 (FIG. 6B). In the embodiment of the door structure depicted in FIGS. 6A-6B, load bearing beams 610 are assembled in the center of the door and load bearing beams 608 are assembled at the peripheral horizontal edges of the door. Both load bearing beams 608 and load bearing beams 610 are structurally similar. As stated above, the number of load bearing beams included in the main frame and their shape can vary depending on the size of the door and its components, load levels and load distribution, and the intended use of the door.

In accordance with the disclosed technique door structure 600 includes no rivets or screws. If the size of the door and its components, load levels and its distribution, and the intended use require extra safety, the door structure according to the disclosed technique can consist of rivets and/or screws. According to the disclosed technique, all components of the main frame are joined together during a one-step production process. After curing of the composite material structure, the door obtained is a monolithic structure that can be preferably made of carbon/epoxy, without rivets or screws and therefore exhibits an enhanced ability to distribute the loads applied over the fittings integrated in its main frame. As illustrated in FIG. 6B, each of plurality of fittings 500 is inserted into each of a plurality of respective slots 612 provided at the end of each of middle horizontal load bearing beams 610 and end horizontal load bearing beams 608. Slots 612 are created with the preparation of the preforms of the main frame from the carbon fabric. In the specific embodiment of airplane cabin door structure 600 illustrated in FIGS. 6A and 6B, middle horizontal load bearing beams 610 and end horizontal load bearing beams 608 are similar in construction. However, in a different embodiment of the disclosed technique the dimensions and construction of each load bearing beam can be different. Cross-sectional views of the load bearing beams along line A-A and line B-B are shown in FIGS. 9A and 9B, respectively. As stated before, the door structure is free of metal screws or rivets. The composite structure of the disclosed technique does not exhibit de-laminations at the interface between the mount portion of the fitting and the main frame due to differences in thermal expansion between metal and composite materials. Such de-laminations occur in prior art structures combining composite material and metal. Moreover, the composite structure of the disclosed technique is not prone to cracks due to local stresses derived from the presence of holes. The composite structure of the disclosed technique minimizes or eliminates the need for screws or rivets. Yet another advantage of the composite structure of the disclosed technique is that the structure will substantially not suffer from rust or corrosion because it is mostly an integral monolithic structure. The composite structure's contour is substantially smooth without having rivets project from the contour of the composite structure. The substantially smooth contour enabled by the disclosed technique results in lower parasitic drag and yields better fuel consumption, lower pollution and reduced noise in flight. An example of a composite structure with these advantages is provided in FIGS. 6A-10B.

Referring back to FIG. 5, as described above, in door 600 (FIG. 6A) at least one anchoring surface is substantially parallel to the plane defined by the X and Z axes. In the example of the disclosed technique showing an airplane cabin door, the fitting includes two anchoring surfaces 510 and 512, which are substantially parallel to the plane defined by the X and Z axes, which is substantially parallel to the center axis of bore 508. Specifically, anchoring surface 512 can be in an angle in a range of between 70 to 110 degrees with respect to the center axis of bore 508.

Figure 7:
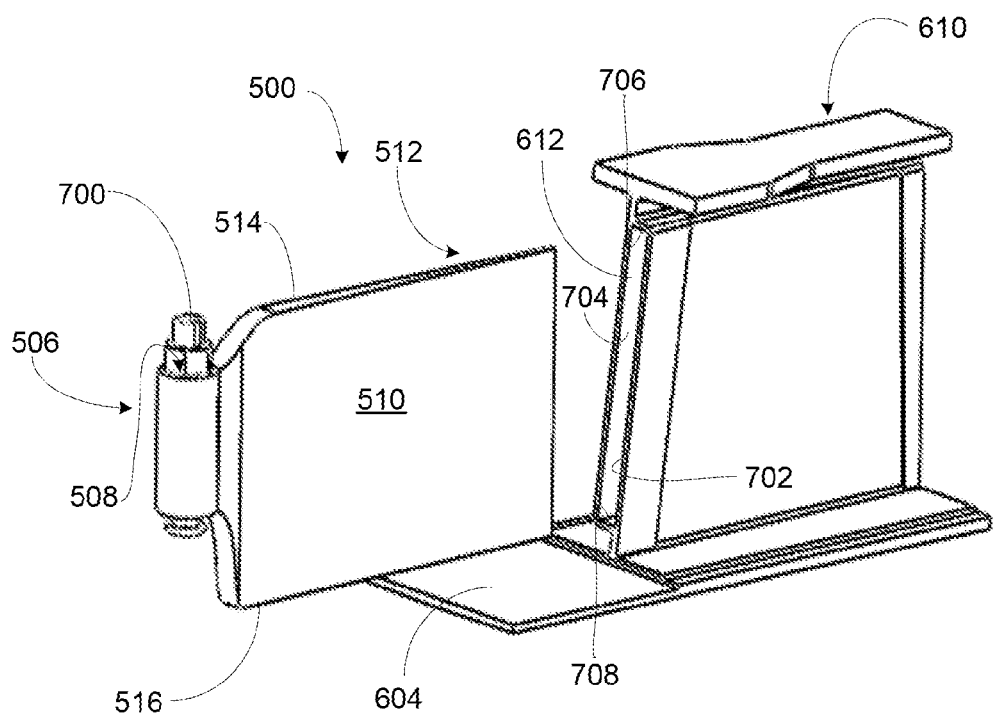
FIG. 7 is a perspective view of the fitting shown in FIG. 5 that interlocks with a beam which is a part of a main frame of the airplane cabin door structure illustrated in FIGS. 6A-6B, constructed and operative in accordance with another embodiment of the disclosed technique.

Reference is made now to FIG. 7, which is a perspective view of the fitting shown in FIG. 5, which interlocks with a beam which is part of a main frame of the airplane cabin door structure illustrated in FIGS. 6A-6B, constructed and operative in accordance with a further embodiment of the disclosed technique. Equivalent reference numbers to fitting 500 in FIG. 5 are used in FIG. 7. In FIG. 7, tubular bushing 700 is shown positioned into longitudinal bore 508. The tubular bushing is made of metal and is a required component of fitting 500 during its operational lifetime in order to prevent crushing of longitudinal bore 508. Furthermore, it can be seen that fitting 500 is inserted into load bearing beam 610. The end of load bearing beam 610 is provided with a slot 612 specifically designed to accommodate fitting 500. It should be appreciated that FIG. 7 is provided herein only as an example to illustrate an assembly of one fitting to a load bearing beam of the main frame of the door. Other shapes of slots and fittings can be used to provide the assembly and is a matter of design choice of the worker skilled in the art. In addition, the location of the fitting in the main frame of the composite material can be changed and the position of the fitting in the slot can be varied according to the design requirements. Slot 612 comprises four beam surfaces 702, 704, 706 and 708. After assembling main frame 602 (FIG. 6A) and fittings 500, beam surface 708 is locally aligned with anchoring surface 516, beam surface 706 is locally aligned with anchoring surface 514, beam surface 704 is locally aligned with anchoring surface 512 and beam surface 702 is locally aligned with anchoring surface 510. Beam surface 704 and beam surface 702 are conjoined (in the middle portion of the beam) into load bearing beam 610 (shown in detail in FIGS. 10A and 10B below). In particular, the reinforcement material structure of the main frame will be further described below in FIG. 8, which is a perspective view of a fitting which is partially interlocked with a beam which is part of a main frame of the airplane cabin door structure illustrated in FIGS. 6A and 6B. However, the following explanation is also relevant for the structure of the reinforcement material of a main frame in any other composite material structure made according to the disclosed technique. The description of FIG. 8 is therefore only to better illustrate the specific features of the disclosed technique and should not be viewed as limiting the disclosed technique to the specific embodiment shown.

Figure 8:
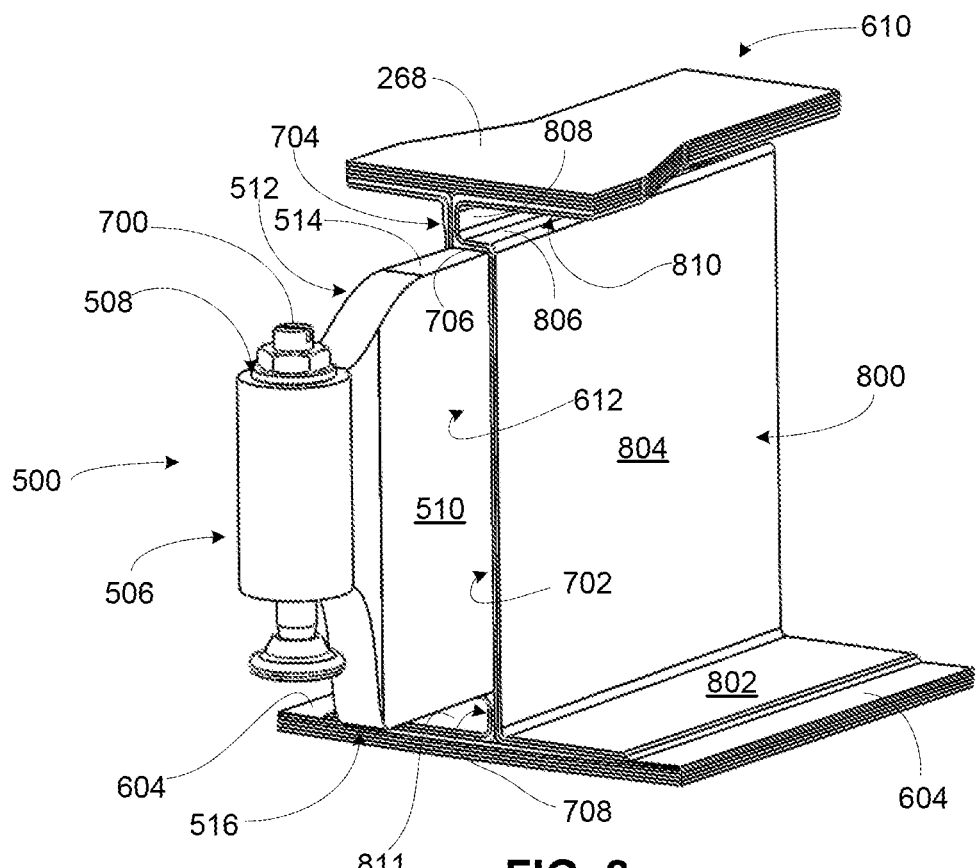
FIG. 8 is a perspective view of a fitting which is partially interlocked with a beam which is part of a main frame of the airplane cabin door structure illustrated in FIGS. 6A-6B, constructed and operative in accordance with a further embodiment of the disclosed technique.
Figure 9A:
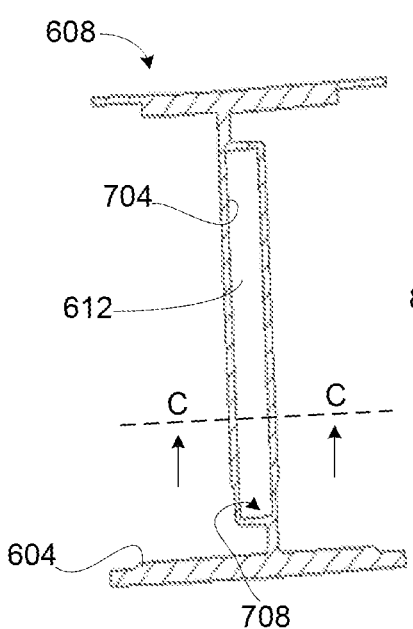
FIG. 9A is a schematic cross-sectional view along line A-A of an edge-section of a load bearing beam which is a part of a main frame of the airplane cabin door structure illustrated in FIG. 6A, constructed and operative in accordance with another embodiment of the disclosed technique.
Figure 9B:
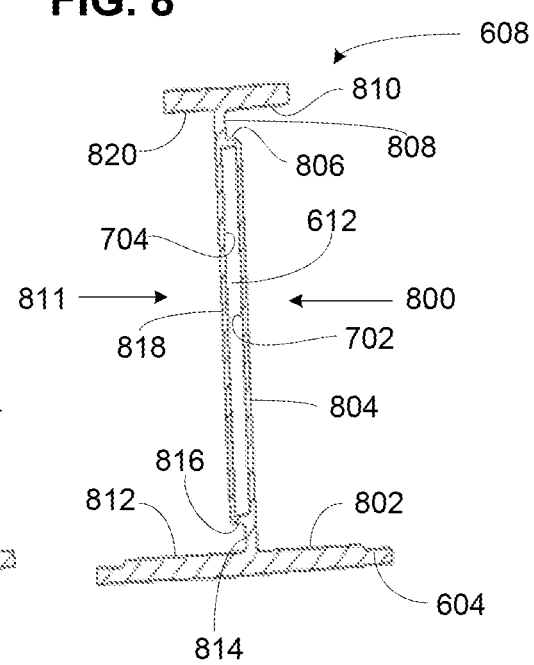
FIG. 9B is a schematic cross-sectional view of a midsection of a load bearing beam which is a part of a main frame of the airplane cabin door structure illustrated in FIG. 6A, constructed and operative in accordance with a further embodiment of the disclosed technique.

Reference is now made to FIG. 8, in which the layout of the layers which form load bearing beam 610 is shown in detail. Equivalent reference numbers in FIGS. 5, 6A and 7 are used in FIG. 8 as well. Load bearing beam 610 is composed of a plurality of layers of reinforcement material. An upper right-hand layer of the reinforcement material (in relation to FIG. 8) will be referenced as load bearing beam layer 800. This layer will be divided into sections only for the purposes of illustration. Load bearing beam layer 800 is adhered to additional lower layers which eventually adhere to lower skin 604. Load bearing beam layer 800 includes a horizontal bottom section 802, a beam surface section 804 which is substantially perpendicular to horizontal bottom section 802, a middle horizontal surface section 806, a middle perpendicular surface section 808 and a top surface section 810, all of which are parts of load bearing layer 800. Load bearing layer 800 along with additional layers (not labeled) form the load bearing beam 610 which is a part of main frame 602 (FIG. 6A). The lowest layer under load bearing beam layer 800 forms beam surfaces 702 and 706 of slot 612. The layers which form beam surface 702 are substantially parallel and are coupled, by the matrix, to the layers forming beam surface 704 at two surfaces along load bearing beam 610. The upper attachment is between middle perpendicular surface section 808 and perpendicular surface section 818, while the lower attachment is between beam surface section 814 (shown in FIG. 9B) and beam surface section 804. Middle perpendicular surface section 808 is substantively perpendicular to anchoring surface 514.

As stated above, the assembly of the composite fitting to the main frame by the gripping of the anchoring surfaces results in an enhanced gripping between main frame 602 and fitting 500. The enhanced gripping between the main frame and fittings which results from the disclosed technique is a combination of the following:

1. Mechanical fastening between the main frame and the fitting. The main frame is composed of layers draped and split into two stacks forming a slot, for example, slot 612. The slot is designed to accommodate a fitting, for example, fitting 500, such that the layers forming the slot are locally aligned with the anchoring surfaces of the fitting. The two stacks of layers that wrap the fitting assure that any movement of the fitting after curing occurs only together with the main frame.

2. Adhesion between the layers of the main frame and the anchoring surfaces of the fitting provided by the resin and the curing process. The pre-cured fitting is covered by the injected resin that wets the main frame in an RTM (an abbreviation of Resin Transfer Molding) process. Alternatively, the pre-cured fitting is covered by the prepreg resin that filled the main frame's layers. A further alternative is that the pre-cured fitting is covered by a film adhesive that is applied on the fitting before curing of the composite structure. A film adhesive can be applied on at least one of the anchoring surfaces of the fitting (for example on anchoring surface 112 and 114 in FIG. 1) or on the anchoring structure (for example on anchoring structure 204 in FIG. 2). In a further embodiment of the disclosed technique the film adhesive is applied on the designated slot in the structural element that belongs to the main frame.

Reference is now made to FIGS. 9A and 9B. FIG. 9A is a schematic cross-sectional view along line A-A of an edge-section of a load bearing beam which is a part of a main frame of the airplane cabin door structure illustrated in FIGS. 6A-6B. FIG. 9B is a schematic cross-sectional view along line B-B of a mid-section of a load bearing beam which is a part of a main frame of the airplane cabin door structure illustrated in FIGS. 6A-6B, both constructed and operative in accordance with a further embodiment of the disclosed technique. With reference to FIG. 9A, end horizontal load bearing beam 608 is shown with slot 612. A schematic cross sectional view of end horizontal load bearing beam 608 along line C-C in FIG. 9A is shown below in FIGS. 10A and 10B.

With reference to FIG. 9B, an upper left-hand layer of the reinforcement material (in relation to FIG. 9B) is referenced as load bearing beam layer 811. Load bearing beam layer 811 is divided into the following sections for illustration purposes only: a horizontal bottom section 812, a beam surface section 814 which is substantially perpendicular to horizontal bottom section 812, a middle bottom horizontal surface section 816, a middle perpendicular surface section 818 and a top surface section 820, all of which are parts of load bearing beam layer 811. Load bearing beam layer 811 is adhered to additional lower layers which eventually adhere to lower skin 604. Load bearing beam layer 811 forms with additional layers the load bearing beam 610 which is a part of the main frame 602. The lowest layer under load bearing beam layer 811 forms beam surfaces 704 and 708 of slot. The layers which form beam surface 704 are substantially parallel to and are coupled, by the matrix, to the layers forming beam surface 702 at two locations along load bearing beam 608. The upper attachment is between middle perpendicular surface section 818 and middle perpendicular surface section 808, while the lower attachment is between beam surface section 814 and beam surface section 804.

Figure 10A:
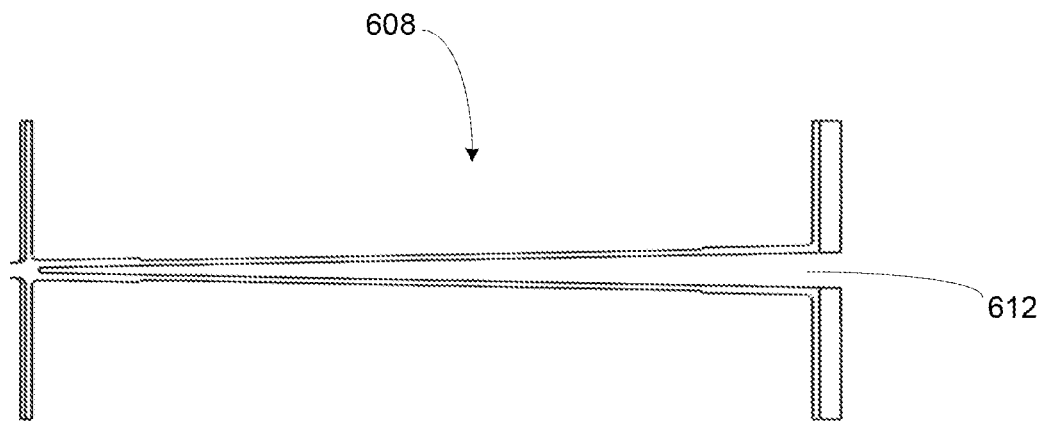
FIG. 10A is a schematic cross-sectional view along line C-C in FIG. 9A of a load bearing beam of the airplane cabin door structure illustrated in FIGS. 6A-6B, constructed and operative in accordance with another embodiment of the disclosed technique.
Figure 10B:
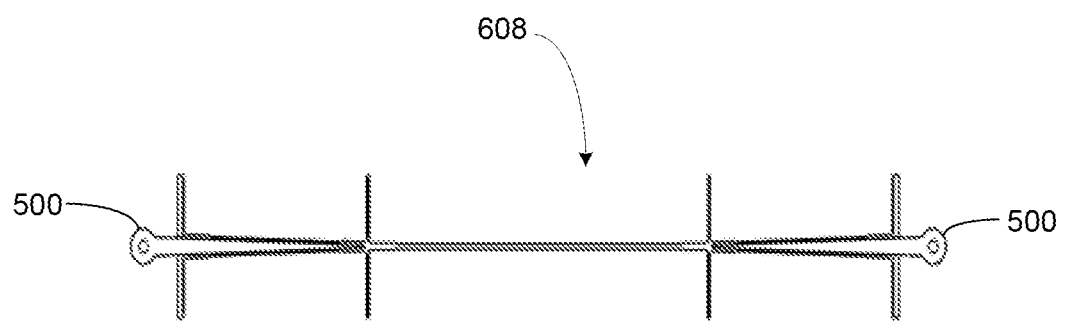
FIG. 10B is a schematic cross-sectional view along line C-C in FIG. 9A of a beam which is a part of a main frame of the airplane cabin door structure illustrated in FIGS. 6A-6B, with a fitting inserted therein, constructed and operative in accordance with a further embodiment of the disclosed technique.

Reference is now made to FIG. 10A, which a schematic cross-sectional view along line C-C in FIG. 9A of a load bearing beam of the airplane cabin door structure illustrated in FIGS. 6A-6B, constructed and operative in accordance with a further embodiment of the disclosed technique. As shown, load bearing beam 608 includes slot 612 which tapers off at one end and is designed to receive and interlock with fitting 500. Reference is now made to FIG. 10B, which is another schematic cross-sectional view along line C-C in FIG. 9A of a beam which is a part of a main frame of the airplane cabin door structure illustrated in FIGS. 6A-6B, with a fitting inserted therein, constructed and operative in accordance with a further embodiment of the disclosed technique. As shown, load bearing beam 608 accommodates fittings 500 in slots 612.

A variety of processes may be used in order to manufacture a composite structure made of a composite material. The composite material structure disclosed herein can be manufactured by using rigid mold mandrels, inflated mandrels, rinse-off mandrels, bladder molding, and lost mandrel type manufacturing. Furthermore, the method of production may be selected from RTM (an abbreviation of Resin Transfer Molding) in a closed-mold, compression molding, autoclave processing (open and closed mold), open mold resin infusion (herein abbreviated RI), vacuum bag molding and filament winding of tows or tapes. Two main methods of manufacturing a composite structure are preferred for the disclosed technique. One method is based on layering up prepreg layers and curing the layers in an oven or an autoclave. The second method is the RTM method in which dry fibers, woven fabrics or tapes are layered in a mold. In the RTM method, the mold has two complementary or matching sides, a male side and a female side or two female sides with cores or mandrels that fit together to produce the required product in the mold. The sides of the mold are put together and then the mold is closed and the resin is injected into the mold cavity. Before the injection of the resin, the product inside the mold is referred to as a composite preform (i.e. layers of dry reinforcement material before injecting a resin). After injection the two components, either dry fibers or woven fabrics and the matrix material are fused by a process of curing. The curing of the composite material can be conducted at either room temperature, in an oven or in a press (i.e., at any elevated temperature corresponding to the resin type or application). Alternatively, it is possible to use prepreg fabrics (for example, layers of a reinforcement material pre-impregnated with a resin) instead of a dry material.

Figure 11:
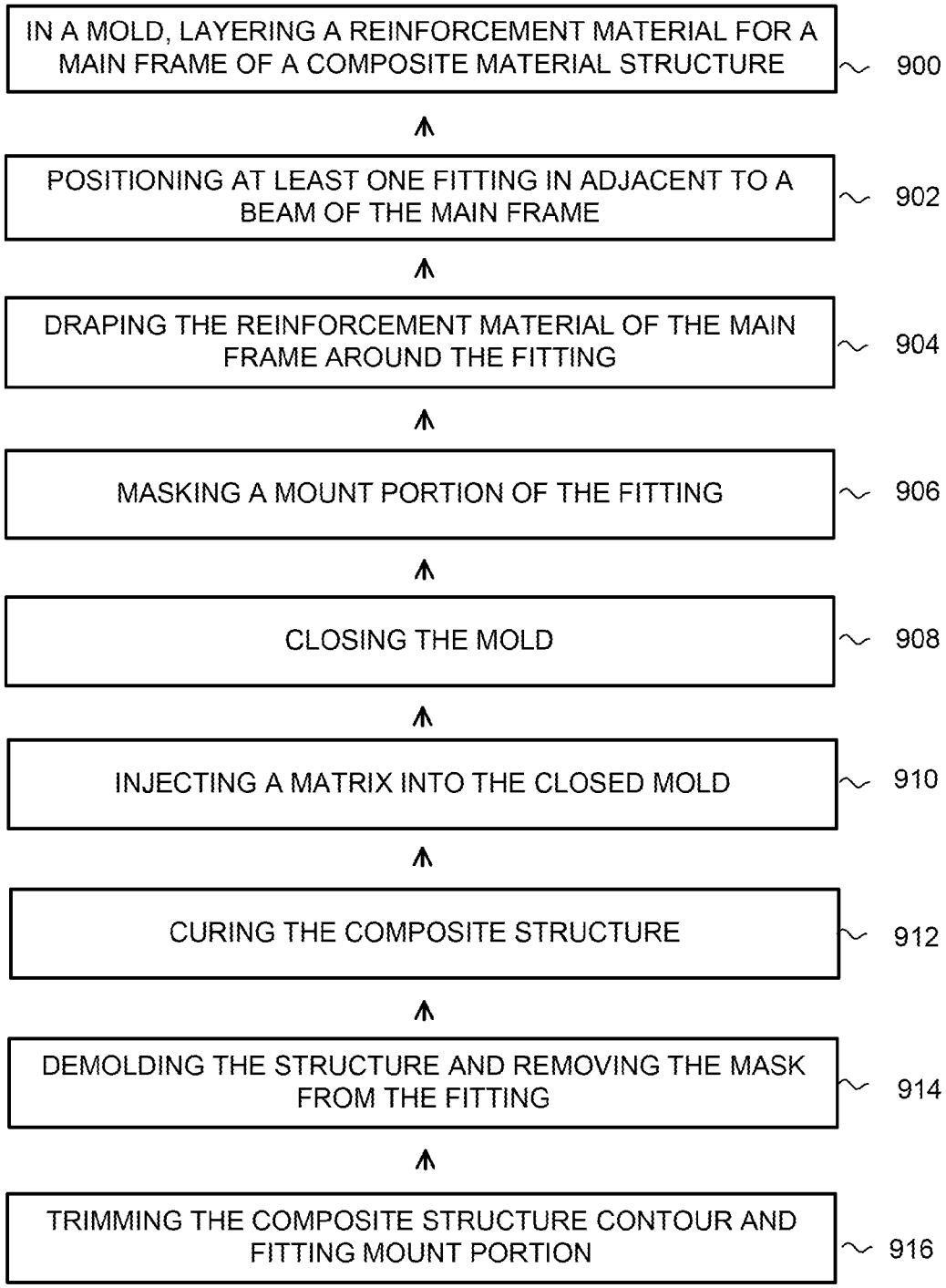
FIG. 11 is a schematic illustration of a method for preparing a composite material structure in RTM, operative in accordance with another embodiment of the disclosed technique.

By way of example, the following is a method for preparing a composite material structure using the RTM method in accordance with an embodiment of the disclosed technique. Reference is now made to FIG. 11, which is a schematic illustration of a method for preparing a composite material structure using RTM, operative in accordance with an embodiment of the disclosed technique. In a procedure 900, a reinforcement material, such as a carbon fabric, is layered in a mold. In the specific embodiment of the disclosed technique, the mold includes inner components (such as mandrels) for constructing the parts of the main frame. These inner components are removed after the composite structure is produced. In an additional embodiment these inner components can be core components which are part of the structure that is produced. As stated above, in one embodiment the mold is comprised of two sides, a female side and a male side, and inner components that match together to form the required shape. The layered reinforcement material in procedure 900 forms a main frame of the desired structure having at least one load bearing beam (for example main frame 302 depicted in FIGS. 3 and 4 and one of load bearing beams 304, 306 or 308). In a procedure 902, after the layers of the main frame have been arranged, at least one pre-cured fitting (for example, fitting 200 illustrated in FIG. 2) is positioned on or within the main frame structure adjacent to the load bearing beams such that at least one anchoring surface is locally aligned with a beam surface, with the result being that the fitting interlocks with at least one adjacent beam surface. The surfaces are locally aligned such that the surfaces of the fitting and the beam are coupled to each other and substantially each point on the anchoring surface is locally aligned with a parallel point on the beam surface. As soon as all the fittings are positioned, the preparation process can progress to procedure 904. In a procedure 904, the reinforcement material is draped around the fittings such that the anchoring structure of the fitting is trapped between (or by) the layers of the main frame. Preferably, the main frame structure including the beams and the anchoring structure of the fitting are wrapped with the reinforcement material in a closed structure.

In a procedure 906, a mount portion of the fitting is protected from being interspersed with a resin. The mount portion of the fitting is masked before the procedure of injecting the resin in order to avoid adhesion of the resin to the structural surfaces of the mount portion which could result in a change of the dimensions of the structure of the bearings and bores. Masking a head portion of the fitting is carried out by covering the head portion of the fitting with an elastomeric cap (such as rubber) or a precise metallic cap (with a cavity) which is removed after curing. In a further embodiment of the disclosed technique the main frame and fitting are prepared at the same time. Both are produced from dry fabric and the preform of the fitting is positioned in the preform of the main frame. Thereafter, the complete structure is interspersed with resin and therefore in this specific embodiment masking the head portion of the fitting is not required. In such case, both the fitting and the main frame are cured simultaneously as well. Optionally, after procedure 906, an outer skin such as outer skin 604 (shown in FIG. 6B) is layered before closing the mold. Alternatively, an outer skin can be layered before procedure 900 or at the same time with procedure 900.

In a procedure 908, the matching two sides of the mold are closed and clamped. In addition, in this procedure and before procedure 910, it is also possible to use vacuum in order to suck air out of the closed mold and pull the resin through it in procedure 910. In a procedure 910, a matrix is injected into the closed mold. Optionally, it is possible to heat the mold to the injection temperature before injecting the matrix. The matrix can be a low-viscosity thermoset resin, for example epoxy. The matrix is typically injected under pressure (for example 50 to 100 psi) into the mold cavity through a port or through a series of ports within the mold. The resin is injected to fill all the voids within the mold and thus penetrates and wets out all surfaces of the reinforcement material. Optionally, before procedure 912, it is possible to add protection elements to specific sections of the composite structure. It is also possible to only cover the specific sections that require protection with the protection elements and then glue the protection elements to the main frame with an adhesive. The protection element is coupled to the reinforcement material or is interlaced in the main frame contour of the flap (for example flap 300) during the preparation of the composite structure. Specifically, the protection element is coupled to the main frame before the procedure of curing. Preferably, the protection element co-bonds to the main frame with the resin used for impregnating the main frame. Thus after procedure 912, the protection element becomes an integral part of the composite material structure.

In a procedure 912, the composite structure is cured. According to one embodiment of the disclosed technique, the matrix is an epoxy resin which is cured at ambient or elevated temperature. It is also possible to use vacuum to enhance the resin flow and reduce void formation. Alternatively, a second resin can be used. In a procedure 914 the composite structure is demolded, removed from the mold, and the mask is taken off the fitting. In a procedure 916, the contour of the composite structure is trimmed. In addition, the mount portion is trimmed. If necessary, post curing of the composite structure can be conducted after procedures 914 or 916. Optionally, it is possible after procedure 916 to insert a metal bushing into the fitting's head portion. In an alternative embodiment of the disclosed technique, the fitting which is positioned adjacent to the load bearing beam of the main frame (as in procedure 902) is constructed with a preparation for a bore for receiving a tubular bushing. In this alternative method, procedure 916 is followed by an additional procedure (not shown) of drilling the required bore in the mount portion of the fitting. The reinforcement material can be a Standard Modulus, High Modulus or Ultra High Modulus carbon fabric in different weave styles such as plain-weave, satin, uni-directional, non-crimp fabrics, stitched fabrics or braided fabrics. Preferably the reinforcement material is 3K-plain weave, 193 g/m$^2$ fabric. Preferable matrices can include thermoset polymers such as epoxy, phenolic, polyester, silicone, bismaleimide, polyimide and polybenzimidazole. However, according to the disclosed technique, any other suitable matrix can be used depending on the selected method of manufacture.

Figure 12:
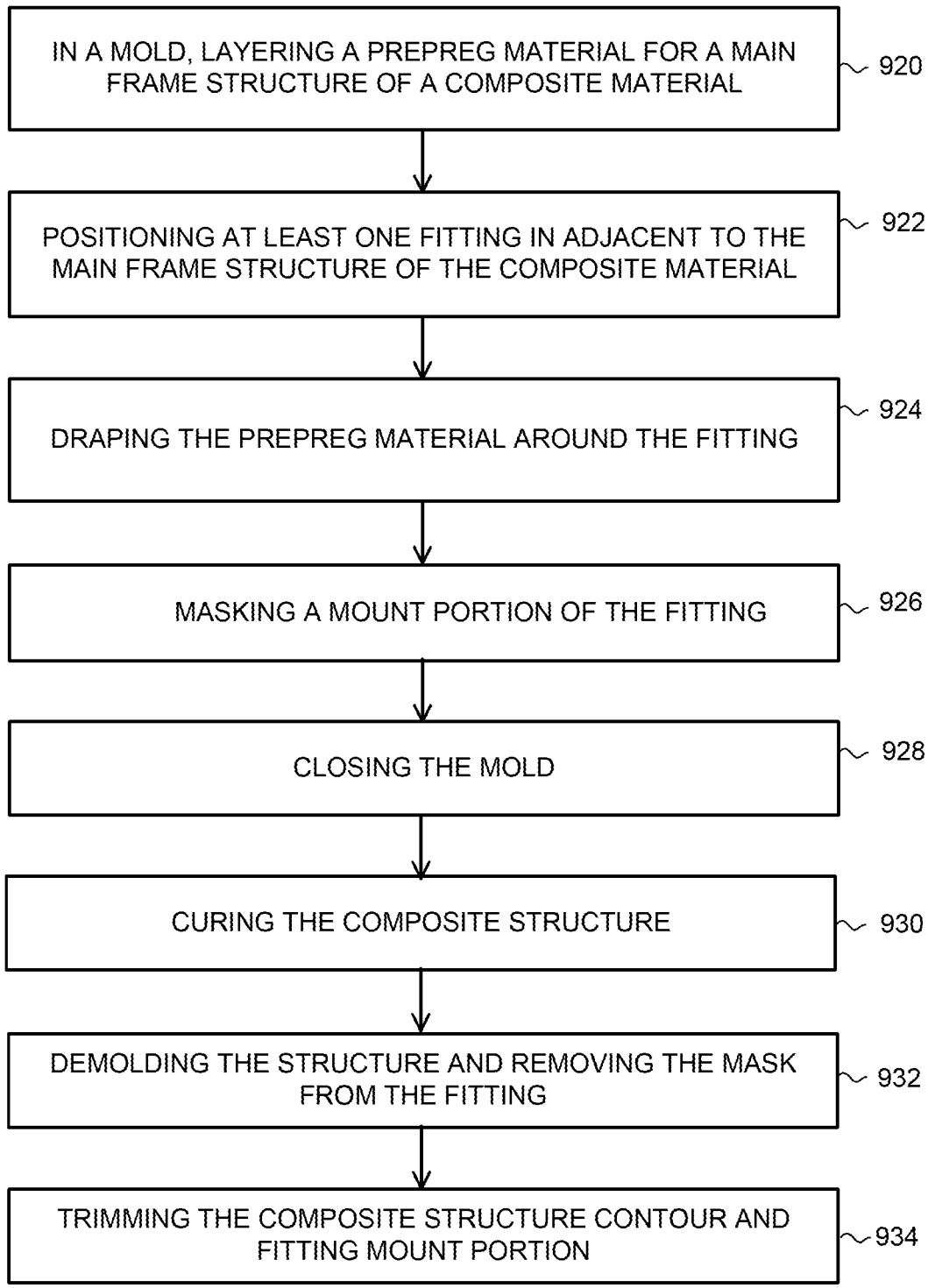
FIG. 12 is a schematic illustration of a method for preparing a composite material structure from a preperg material, operative in accordance with a further embodiment of the disclosed technique.

According to another embodiment of the disclosed technique, an alternative method to the one just described can be executed using a prepreg. The alternative method includes procedures 920 through 934 as depicted in FIG. 12, which is a schematic illustration of a method for preparing a composite material structure from a preperg material, operative in accordance with a further embodiment of the disclosed technique. In a procedure 920, a prepreg material is layered in a mold. A prepreg material, as referred to in the text, is any material made of layers of a reinforcement material, typically fabrics, which are pre-impregnated with a resin. An example of such a material is ACG-MTM45-1/CF0526A 50" 193 gsm PW 36% RC. The layered prepreg material in procedure 920 forms a main frame of the desired structure having at least one load bearing beam. In a procedure 922, after the layers of the main frame have been arranged, at least one fitting is positioned on or within the main frame structure, adjacent to the at least one load bearing beam such that at least one anchoring surface is locally aligned with a beam surface, with the result being that the fitting interlocks with at least one adjacent beam surface. Similarly to procedure 902 in FIG. 11, the surfaces are locally aligned such that the surfaces of the fitting and the beam are closely coupled to each other. An adhesive film is positioned between the composite material fitting and the main frame and thereafter the prepreg material is draped around a portion of the fitting.

As soon as all the fittings and adhesive film are positioned, the preparation method can progress to procedure 924. In a procedure 924, the prepreg material is draped around the fittings such that the anchoring structure of the fitting is trapped between the layers of the main frame. Preferably, the main frame structure including the beams and the anchoring structure of the fitting are wrapped with the prepreg material in a closed structure. In a procedure 926, a mount portion of the fitting is protected from being interspersed with a resin. The mount portion of the fitting is masked before curing in order to avoid adhesion of resin from the prepreg to the structural surfaces of the mount portion which could result in a change of the dimensions of the structure of the bearings and bores. Masking a head portion of the fitting is carried out by covering the head portion of the fitting with a rubber cap or a precise metallic cap with a cavity which is removed after curing. In a further embodiment of the disclosed technique, the main frame and fitting are prepared at the same time. Both are produced from prepreg material and the preform of the fitting is positioned in the preform of the main frame. Thereafter, the complete structure is cured and in this specific embodiment, masking of the head portion of the fitting is not required. Optionally, after procedure 926, it is possible to add an additional procedure (not shown) of layering an outer skin. It is noted that such a procedure can be performed before procedure 920 as well.

In a procedure 928, the matching two sides of the mold are closed and clamped. Optionally, before procedure 930, it is possible to add protection elements to specific sections of the composite structure. It is also possible to only cover the specific sections that require protection with the protection elements and then glue the protection elements to the main frame using the matrix within the prepreg material or adding a second matrix. In a procedure 930, the composite structure is cured. In a procedure 932 the composite structure is demolded, removed from the mold, and the mask is taken off the fitting. In a procedure 934, the contour of the composite structure is trimmed. In addition, in this procedure the mount portion is also trimmed. If necessary, post curing of the parts can be done after procedures 932 or 934. Optionally, as in the method illustrated in FIG. 11, it is also possible to insert a metal bushing to the fitting's head portion at this stage as well. In a further embodiment of the disclosed technique, it is possible to provide a prepreg material without bores (such as bores 110, 208 or 508 in FIGS. 1, 2 and 5 respectively) and to drill such bores in an additional procedure (not shown), after procedure 934, in which the final finishing of the product takes place.

Figure 13:
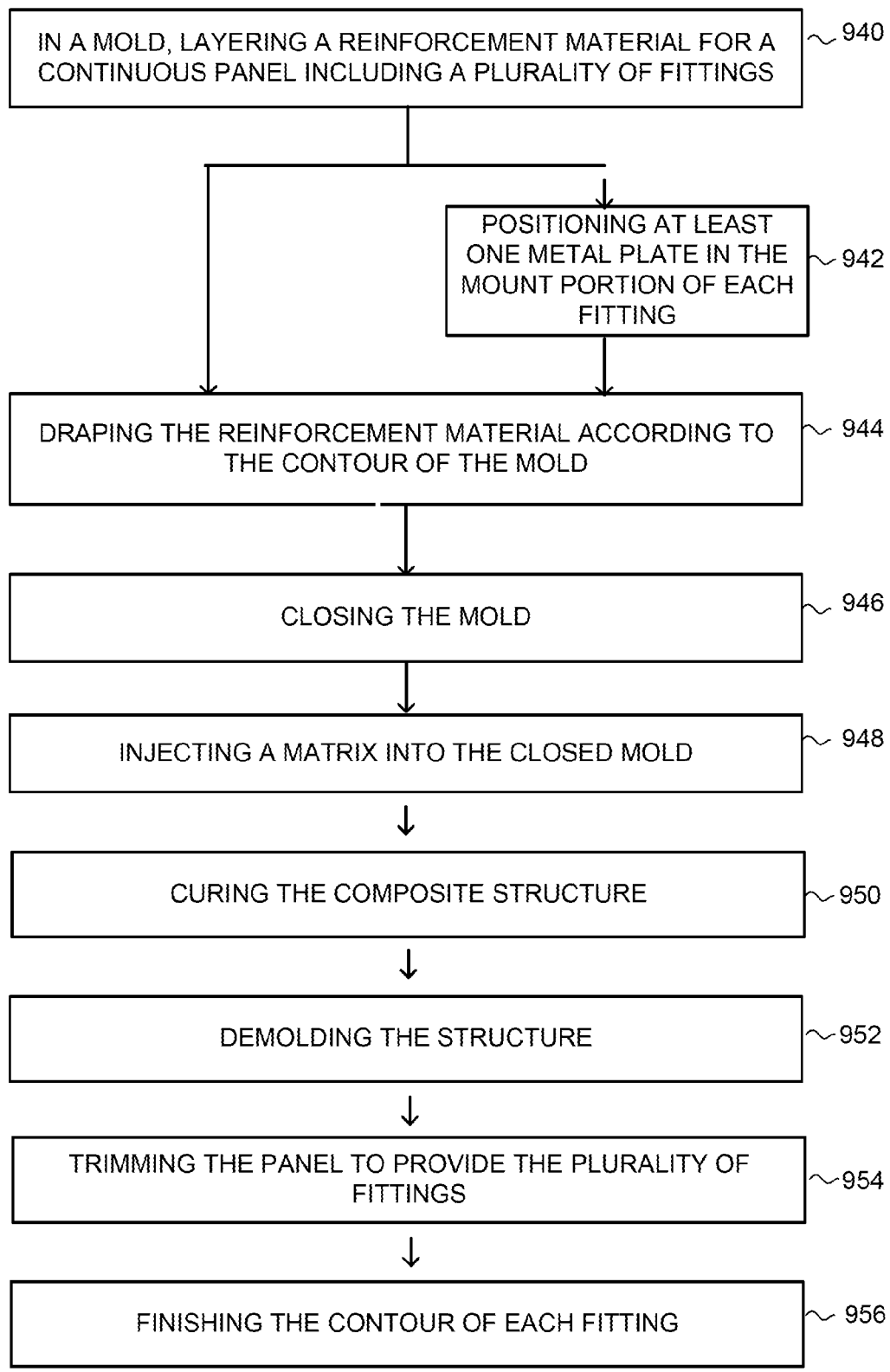
FIG. 13 is a schematic illustration of a method for preparing a continuous panel with a plurality of fittings made of a composite material in RTM, operative in accordance with another embodiment of the disclosed technique.

Reference is now made to FIG. 13, which is a schematic illustration of a method for preparing a continuous panel with a plurality of fittings made of a composite material in RTM, operative in accordance with another embodiment of the disclosed technique.

In a procedure 940, layers of reinforcement material are arranged in a specific mold for a continuous panel including plurality of fitting. The mold is comprised of, for example, at least two sides and an inner component, such as a female side, a male side, a head portion part and an extractable rod for creating a longitudinal bore, such as bores 110 (FIG. 1), 208 (FIG. 2) or 508 (FIG. 5). Alternatively, the mold can be comprised of two female sides and a core or mandrel. Both sides are designed to match each other such that the desired shape of the continuous panel of the composite material is created in the interior portion of the closed mold. The method illustrated in FIG. 13 can be used to manufacture fitting 200 (FIG. 2) or fitting 500 (FIG. 5). The difference between the two embodiments of the disclosed technique is in the insertion of reinforcing metal plates, which is optional. Usually, the structural design and the intended use determine whether reinforcements such as a metal insert are required or not.

For example, in the production of fitting 200, the method goes to procedure 942, which is positioning at least one metal plate in the mount portion of each fitting along the continuous panel. Such a metal insert is mounted in the mold in order to distribute pressure during the operational lifetime of the composite material. In a procedure 942, at least one metal plate is positioned in the mount portion of each fitting. However, in the preparation of a fitting such as fitting 500, there is no need to insert metal plates. As such, from procedure 940, the method can then proceed to procedure 944. In procedure 944 reinforcement material is draped according to the contour of the mold. Thereafter, the mold is closed in procedure 946 and matrix is injected into the closed mold in procedure 948. In procedure 950, the composite structure is cured. After curing in procedure 950, the composite structure is demolded in procedure 952. The panel trimmed to provide the plurality of fittings in procedure 954. Subsequently, in a procedure 956, a finishing of the contour of each fitting is carried out.

Figure 14:
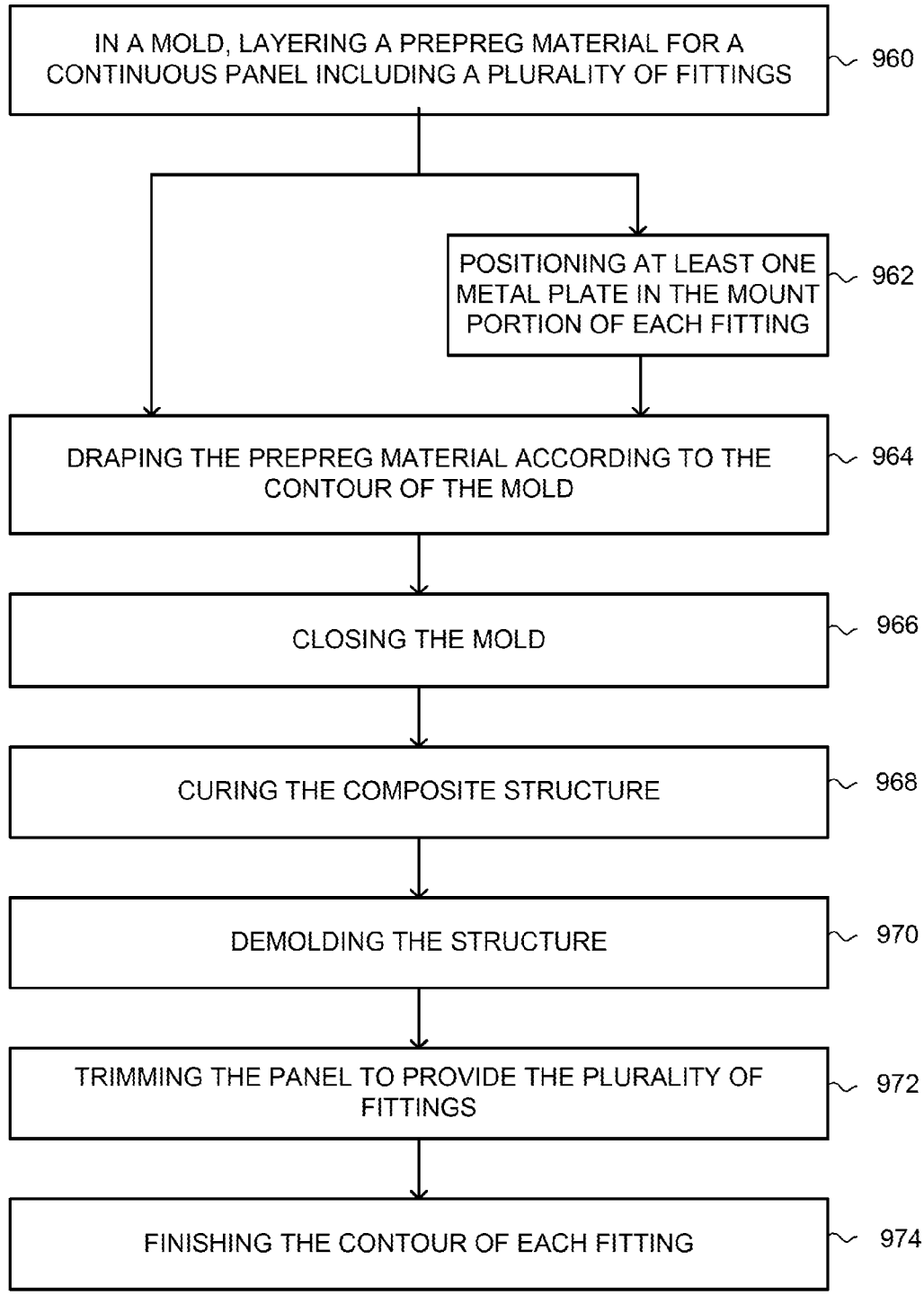
FIG. 14 is a schematic illustration of a method for preparing a continuous panel with a plurality of fittings made of a composite material with a prepreg material, operative in accordance with a further embodiment of the disclosed technique.

Reference is now made to FIG. 14, which is a schematic illustration of a method for preparing a continuous panel with a plurality of fittings made of a composite material with a prepreg material, operative in accordance with another embodiment of the disclosed technique. In a procedure 960, layers of prepreg material, for example, a carbon prepreg, are arranged in a specific mold for a continuous panel. The mold is comprised of, for example, at least two sides and an inner component, such as a female side, a male side, a head portion part and an extractable rod for creating a longitudinal bore, such as bores 110 (FIG. 1), 208 (FIG. 2) or 508 (FIG. 5). For example, in the production of fitting 200, the method goes to procedure 962, which is positioning at least one metal plate in the mount portion of each fitting along the continuous panel. Such a metal insert is mounted in the mold in order to distribute pressure during the operational lifetime of the composite material. In a procedure 962, at least one metal plate is positioned in the mount portion of each fitting. However, in the preparation of a fitting such as fitting 500, there is no need to insert metal plates. As such, from procedure 960, the method can then proceed to procedure 964.

Figure 15A:
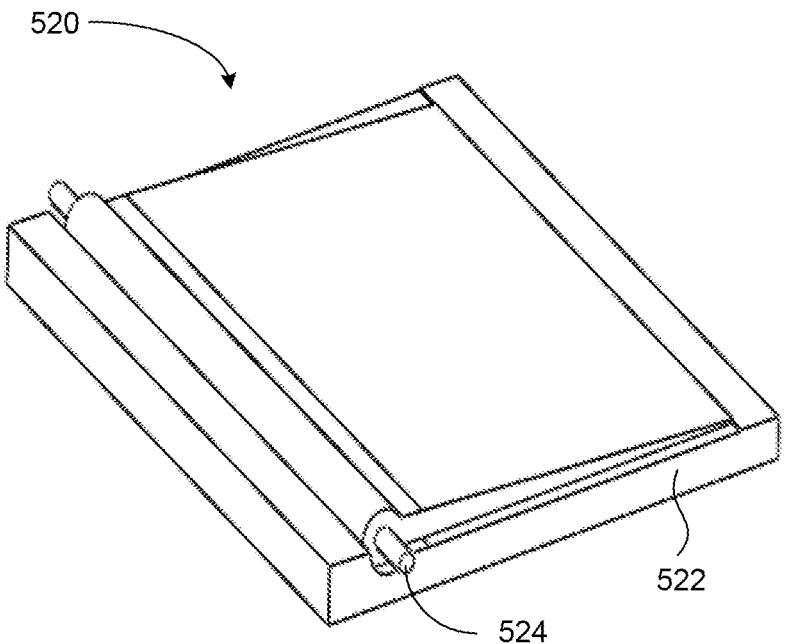
FIG. 15A is a schematic illustration showing a continuous panel including a plurality of fittings as shown above in FIG. 5, before a procedure of cutting, constructed and operative in accordance with another embodiment of the disclosed technique.
Figure 15B:
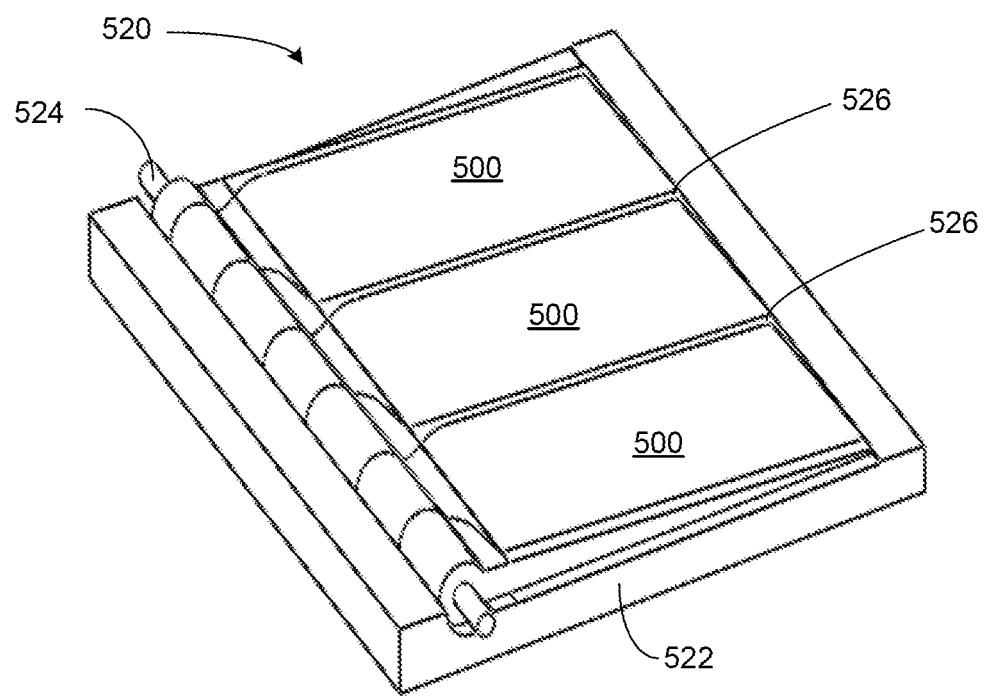
FIG. 15B is a schematic illustration showing the panel of FIG. 15A with the cutting lines on it, constructed and operative in accordance with a further embodiment of the disclosed technique.

In a procedure 964, in order to complete the form of the fitting, the reinforcement material is draped along the continuous panel and around the fittings and metal plates, if any. In a procedure 966, the mold is closed and clamped and thereafter the mold is wrapped with a vacuum bag or closed with appropriate screws that maintain close attachment of all components of the mold during the procedure of curing. In a procedure 968, the curing of the composite material takes place in the appropriate conditions which are defined by the reinforcement material and the resin used. When the curing has completed, in a procedure 970, the continuous panel is demolded. In a procedure 972, the demolded continuous panel is trimmed to provide the plurality of fittings. Optionally, if required, in a procedure 974, a finishing of the contour of the fittings is carried out. Reference is now made to FIGS. 15A and 15B. FIG. 15A is a schematic illustration showing a continuous panel including a plurality of fittings as shown above in FIG. 5, before the procedure of cutting, constructed and operative in accordance with another embodiment of the disclosed technique. FIG. 15A illustrates a continuous panel 520 including a plurality of fittings 500 (shown in FIG. 5), before a procedure of cutting. FIG. 15B is a schematic illustration showing the panel of FIG. 14A with the cutting lines on it, constructed and operative in accordance with a further embodiment of the disclosed technique. As shown, panel 520 is designed for the preparation of three fittings such as fitting 500. Panel 520 is placed in a mold 522. An extractable rod 524 for creating a longitudinal bore (such as bore 508 shown in FIG. 5) is inserted into the head portion of continuous panel 520. The panel is cut along lines 526 as seen in FIG. 15B, thus producing three fittings.

It will be appreciated by persons skilled in the art that the disclosed technique is not limited to what has been particularly shown and described hereinabove. Rather the scope of the disclosed technique is defined only by the claims, which follow.

We claim:

1. A composite material structure comprising at least one reinforcement material and at least one matrix material, said composite material structure comprising:
    a main frame with at least one load bearing beam having at least one beam surface to which at least one composite material fitting is integrally attached, said at least one composite material fitting comprising:
    at least one mount portion comprising a bore for receiving a tubular bushing; and
    an anchoring structure extending from or coupled with said at least one mount portion, said anchoring structure is integrally attached with said main frame; wherein said anchoring structure is comprised of at least one anchoring surface, at least one of said at least one anchoring surfaces is locally aligned with a beam surface and at least one of said at least one anchoring surfaces being substantially parallel to a center axis of said bore;

wherein said at least one anchoring surface being substantially parallel to a center axis of said bore is permanently attached to said main frame; wherein said composite material fitting is prepared from at least one reinforcement material and at least one matrix material and wherein said main frame is prepared from at least one reinforcement material and at least one matrix material; and wherein said main frame and said composite material fitting are conjoined by at least one matrix material.

2. A composite material structure according to claim 1, wherein said main frame comprises at least one main frame surface to which at least one anchoring surface is locally aligned.

3. A composite material structure according to claim 1, for use in an aircraft.

4. A composite material structure according to claim 1, for use in a vehicle.

5. A composite material structure according to claim 1, formed in a structure selected from the list consisting of: a wing, a control surface, a flap, an aileron, a spoiler, a rudder, a stabilizer, an external fuel tank sections or a complete external fuel tank, an airplane cabin door, an airplane barrel section, a nacelle section, a body or chassis section and a fairing or a cover.

6. A composite material structure according to claim 1 that comprises at least one reinforcement material which is a fabric.

7. A composite material structure according to claim 1 wherein said at least one reinforcement material is selected from the list consisting of: glass, carbon, silicon carbide, aramid and a high strength polyethylene fiber.

8. A composite material structure according to claim 1, wherein said at least one matrix material is a thermoplastic or a thermoset polymer.

9. A composite material structure according to claim 1 wherein said composite material structure comprises a matrix material which is selected from the list consisting of: epoxy, phenolic, polyester, silicone, bismaleimide, polyimide and polybenzimidazole.

10. A composite material structure according to claim 1 wherein said composite material structure is manufactured by any one of the production methods selected from the list consisting of: closed mold RTM, compression molding, autoclave processing, open mold RI (resin infusion), vacuum bag molding and filament winding of tows or tapes.

11. A composite material structure according to claim 1 wherein said at least one mount portion further comprises a metal plate.

12. A composite material structure according to claim 1 wherein said fitting comprises a tubular bushing made of metal.

13. A composite material structure according to claim 1 wherein said composite material structure is a control surface and wherein the configuration of said control surface is characterized by at least one of:
  (a) at least one protection element embedded in said control surface to create a closed structure; and
  (b) at least one co-bonded protection element which covers a portion of said control surface.

14. A composite material structure according to claim 1 wherein said main frame is constructed from layers of reinforcement material, and wherein said layers of reinforcement material are draped over a portion of said fitting.

15. A composite material structure according to claim 14 wherein said layers of reinforcement material constructing said main frame are separated such that in between them said composite material fitting is positioned.

16. A composite material structure according to claim 1 wherein said at least one composite material fitting comprises at least one anchoring surface which is locally aligned with a beam surface, being substantially perpendicular to a center axis of said bore.

17. A composite material structure according to claim 1 wherein one of said at least one anchoring surfaces is in an angle in a range of between 70 to 110 degrees with respect to a center axis of said bore.

\* \* \* \* \*